Aug. 17, 1965
M. W. JOHNSON
3,201,682
VOLTAGE STABILIZATION USING A PLURALITY
OF TRANSISTORS AND A ZENER DIODE
Filed Sept. 23, 1960

INVENTOR
*MAURICE W. JOHNSON*

BY
AGENT

3,201,682
VOLTAGE STABILIZATION USING A PLURALITY OF TRANSISTORS AND A ZENER DIODE

Maurice W. Johnson, Plympton, South Australia, Australia, assignor to North American Philips Company, Inc., New York, N.Y., a corporation of Delaware Filed Sept. 23, 1960, Ser. No. 58,127
2 Claims. (Cl. 323—22)

The present invention relates to a voltage stabilizer including a Zener diode and at least one transistor.

Figure 1:
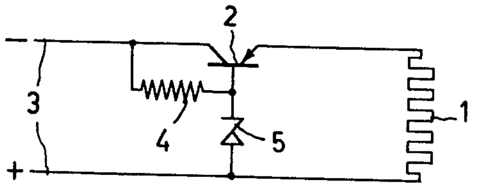
FIG. 1 (PRIOR ART)
FIGURE 1 is an illustration of the prior art.

FIG. 1 of the accompanying drawing shows a known stabilizer of this kind. This voltage stabilizer is intended to supply a stabilized direct voltage to a load 1. It includes a transistor 2, for example, of the pnp-type, the emitter of which is connected to the load 1 and through this load to the positive terminal of a direct voltage source 3, its collector being directly connected to the negative terminal of this source 3. The base electrode of the transistor 2 is connected to its collector and to the negative terminal of the source 3 through a resistor 4 and to the positive terminal of this source via a Zener diode 5. The Zener diode 5 thus stabilizes the voltage between the positive terminal of the source 3 and the base electrode of the transistor 2. It is known that the voltage across a diode connected in the reverse direction, for example the Zener diode 5, is substantially constant as soon as the applied voltage supplied via an impedance exceeds the so-called Zener voltage of this diode. The voltage across the load 1 is thus stabilized at a value which is slightly lower than that of the Zener voltage of the diode 5; the difference normally amounts to a few volts.

If the difference between the voltage of the source 3 and the desired voltage across the load 1 is large, it is necessary to use a special type of transistor 2 in order to avoid exceeding the maximum permissible voltages for this transistor; this type of transistor is generally rather expensive.

The present invention has for its object to render it possible to use, instead of such an expensive transistor, a plurality of cheaper transistors, each of which has an admissible voltage which is too low to stabilize the voltage across a load due to the difference between the voltage of the direct voltage source and the voltage desired across the load exceeding the maximum permissible voltage of a single transistor.

The voltage stabilizer according to the invention is characterized in that the collector of one transistor is connected to the direct voltage source via the collector-emitter path of at least one further transistor, and in that a current is fed to the base electrode of each transistor via a number of series-connected resistors corresponding to the number of transistors, the base electrode of each further transistor being connected to the junction of the resistors corresponding to the said transistor and to the preceding transistor in the sequence of transistors connected between the load and the voltage source.

Figure 2:
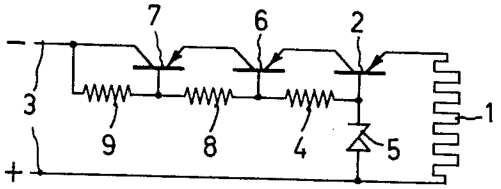
FIGURE 2 shows one embodiment of a voltage stabilizer according to the invention.

FIG. 2 shows one embodiment of a voltage stabilizer according to the invention. As in the known stabilizer of FIG. 1, this voltage stabilizer comprises a transistor 2, the collector-emitter path of which is connected between the negative terminal of the direct voltage source 3 and the corresponding terminal of the load 1; the other terminal of the load 1 is connected directly to the positive terminal of the source 3 and the base of transistor 2 is also connected to the positive terminal through a Zener diode 5. A forward current is fed to the base electrode through a resistor 4, and the current passing through the resistor 4 also biases the diode 5 in the reverse direction with a voltage exceeding the Zener voltage and partly flows in the reverse direction through the said diode.

In accordance with the invention, the collector of the transistor 2 is connected to the negative terminal of the source 3 through the series-connected collector-emitter paths of two further transistors 6 and 7. Moreover, further resistors 8 and 9 are connected in series with the resistor 4 between the negative terminal of the source 3 and the base electrode of the transistor 2. The base electrodes of the transistors 6 and 7 are connected to the junctions of the resistors 4, 8 and 9, in the order of succession in which the collector-emitter paths thereof are connected between the negative terminal of the source 3 and the collector of the transistor 2.

In a practical embodiment, the load 1 was formed by a telephone amplifier having two push-pull connected transistors. This amplifier had to be fed with a voltage of 12 v. at a maximum current consumption of 60 ma. The direct voltage source supplied a voltage of 50 v., which was fed to this amplifier via a line of a length of about 0 to 3 kms. and a maximum resistance of 500 ohms and via the voltage stabilizer. The Zener diode used had a Zener voltage of 14 v. and the stabilisation was maintained down to a voltage of about 14 v. at the input terminals of the stabilizer. This stabilizer comprised three conventional pnp-transistors of the type OC16.

The stabilizer described comprises three transistors of the same type, among which the voltage and the power dissipation are equally distributed. However, in accordance with the invention as delimited in the claims, a stabilizer may include a larger number of transistors connected in series with each other in a similar manner. Other modifications of the invention will also be apparent to those skilled in the art without departing from the inventive concept.

What is claimed is:

1. A voltage stabilizer circuit comprising: a direct voltage source, a first transistor having base, emitter and collector electrodes, said emitter being connected to one terminal of a load, the other terminal of the load being connected to one terminal of said source, said collector being connected to the other terminal of said source through the collector-emitter path of at least one additional transistor, said source biasing the emitter in the forward direction and the collector in the reverse direction, said base being connected to said other terminal of said source through a plurality of series-connected resistors equal in number to the total number of transistors, said base also being connected to said one terminal of the source through a Zener diode, the base electrode of each additional transistor being directly connected to a corresponding junction point of the series-connected resistors.

2. A voltage stabilizer circuit comprising: a direct voltage source having first and second terminals, a first series circuit bridging said terminals, said first series circuit comprising a plurality of resistors and a Zener diode, one end of said Zener diode being connected to said first source terminal, a second series circuit bridging said terminals, said second series circuit comprising the collector-emitter paths of a plurality of transistors and a load, the first transistor of said second series circuit having its emitter connected to one terminal of the load and its base connected to the end of said Zener diode remote from said first source terminal, the other terminal of the load being connected to the first source terminal, the emitter of the second transistor of the second series circuit being connected to the collector of the first transistor, and the emitter of each succeeding transistor of the second series circuit being connected to the collector of the preceding transistor, the base of the second and each succeeding transistor being directly connected to a corresponding junction point of the series-connected resistors, whereby variations in the current through the Zener diode cause current variations through all the series-connected resistors thereby imparting control variations to all the series-connected transistors.

References Cited by the Examiner

UNITED STATES PATENTS

| | | | |
|---|---|---|---|
| 2,915,693 | 12/59 | Harrison | 323—22 |
| 2,922,945 | 1/60 | Norris et al. | 323—22 |
| 2,957,993 | 10/60 | Sichling | 307—88.5 |
| 2,978,630 | 4/61 | De La Tour. | |
| 2,999,984 | 9/61 | Beck. | |
| 3,018,433 | 1/62 | Stone. | |
| 3,105,187 | 9/63 | Schauwecker | 323—22 |

OTHER REFERENCES

Publication: "Transistor Voltage Regulator," by R. H. Spencer and T. S. Gray, A.I.E.E. publication, March 1956.

"Design of a Transistorized Voltage Regulator," by John H. Porter; published in Electronic Equipment, September 1957.

LLOYD McCOLLUM, *Primary Examiner.*

ORIS L. RADER, *Examiner.*